April 5, 1932.　　　J. A. WALLER　　　1,852,276
APPARATUS FOR DRESSING CIRCULAR SAWS
Filed July 16, 1929　　5 Sheets-Sheet 1
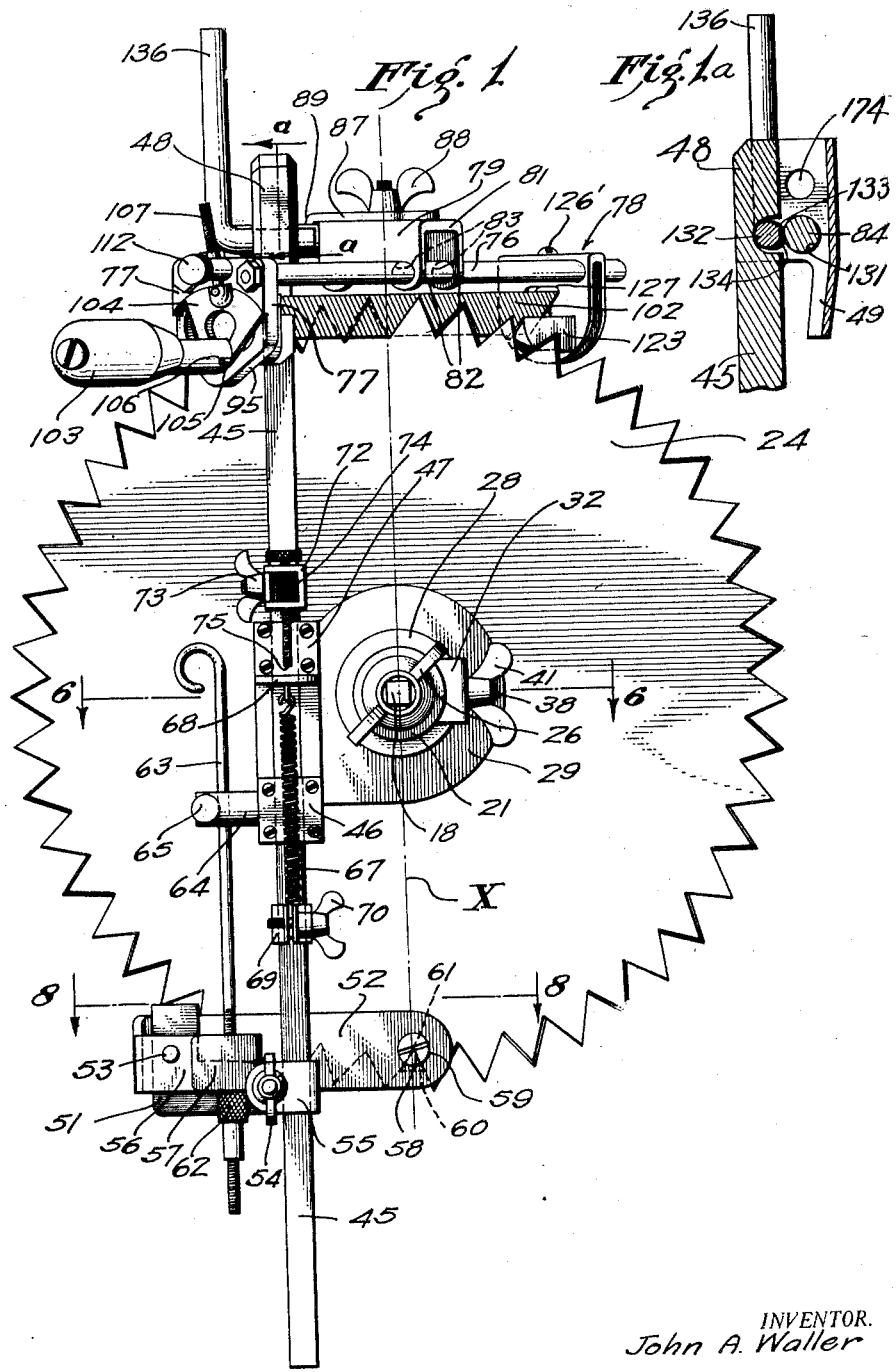
INVENTOR.
John A. Waller
BY *Arthur P. Knight and Alfred W. Knight*
ATTORNEYS

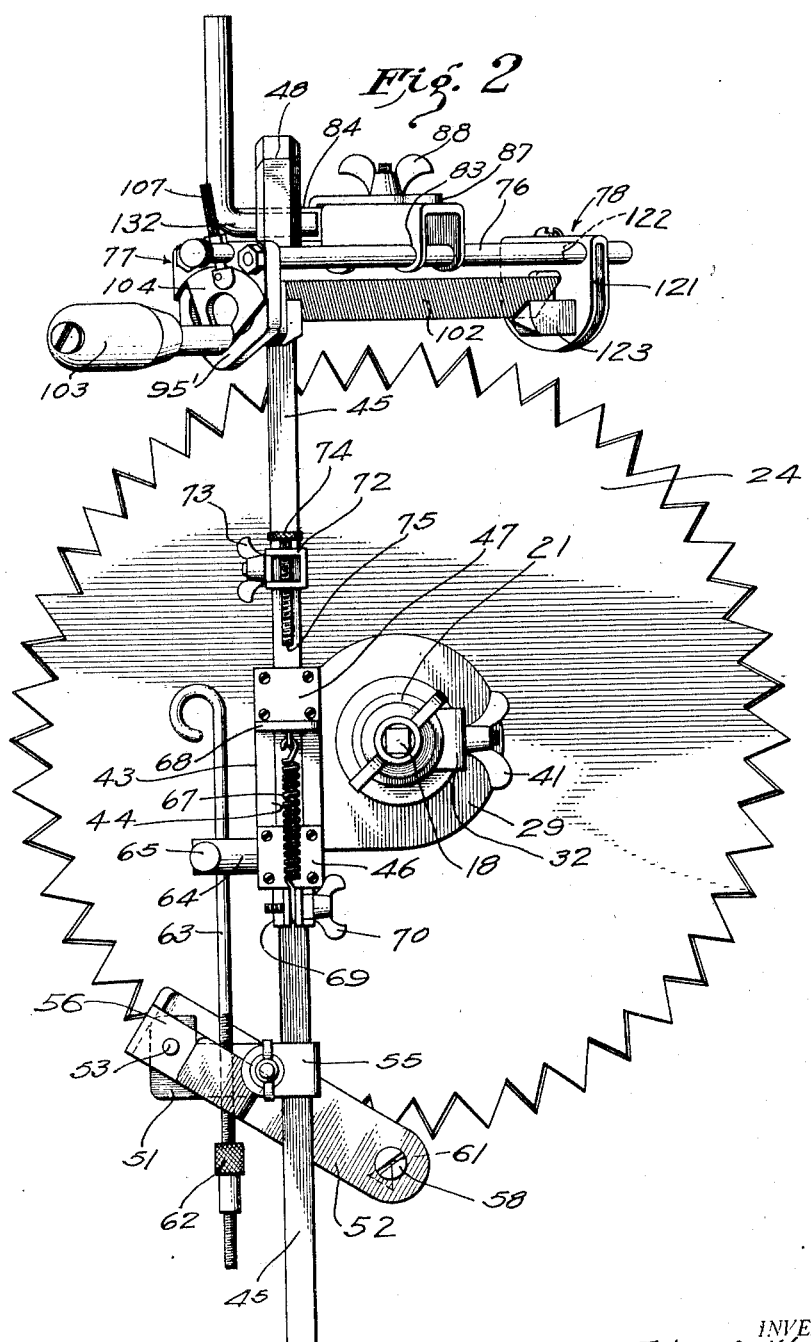

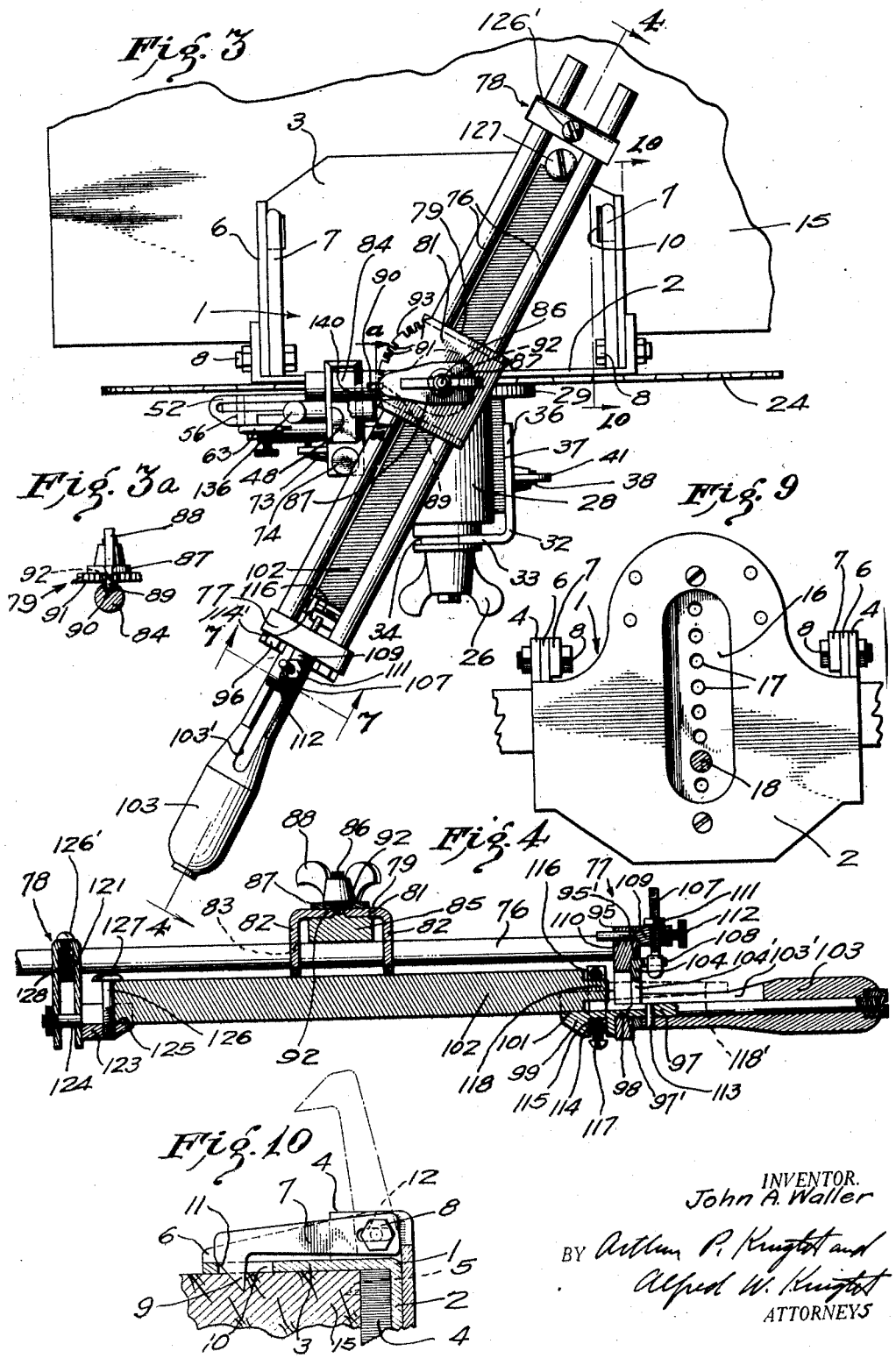

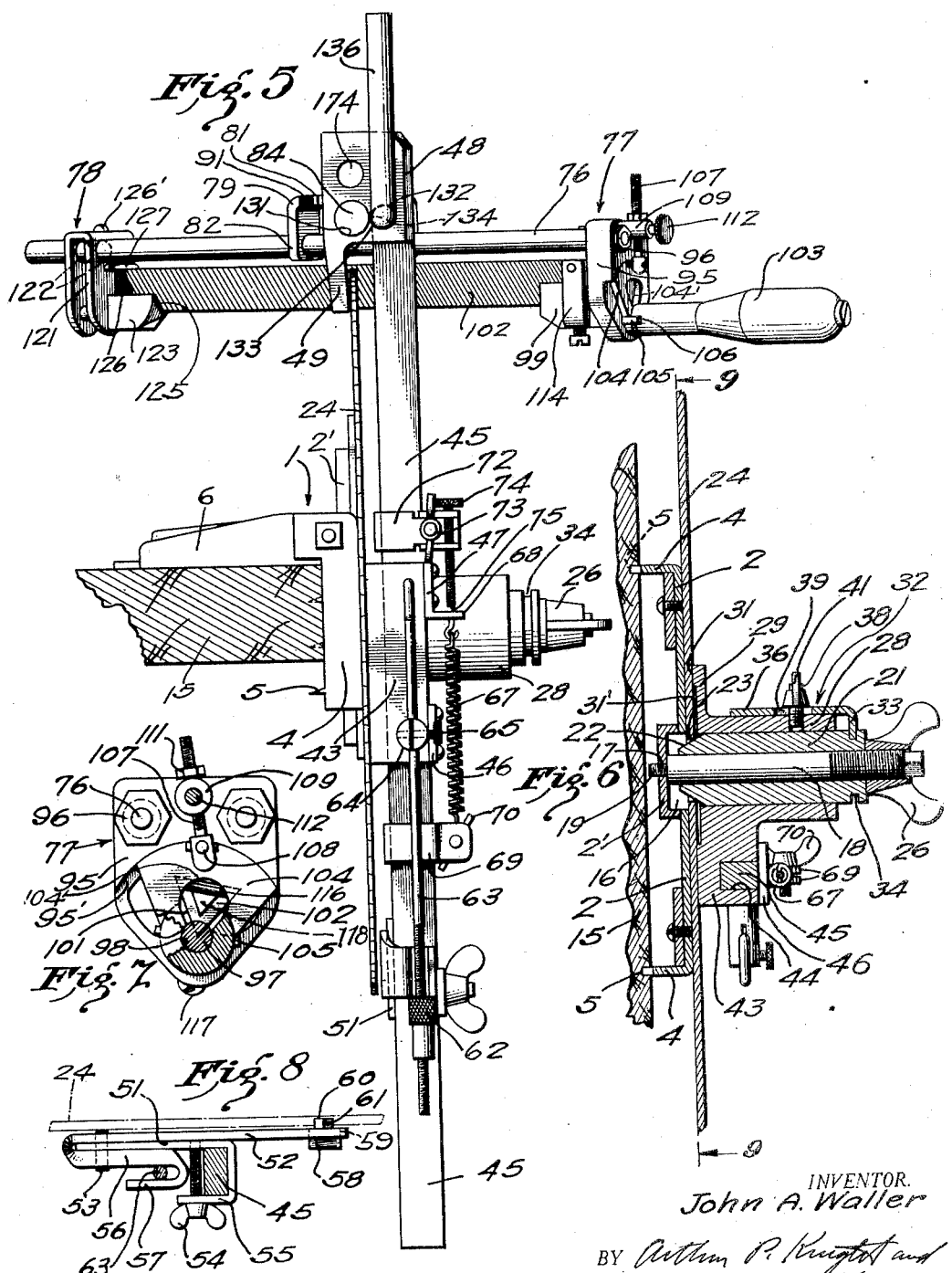

April 5, 1932.     J. A. WALLER     1,852,276
APPARATUS FOR DRESSING CIRCULAR SAWS
Filed July 16, 1929     5 Sheets-Sheet 5
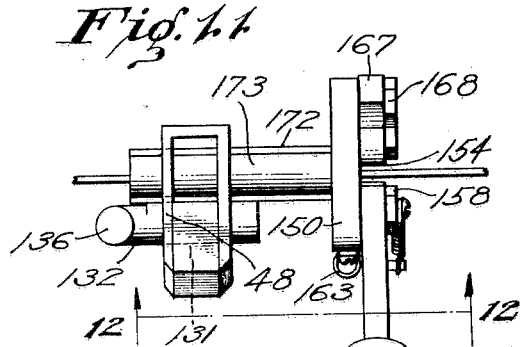
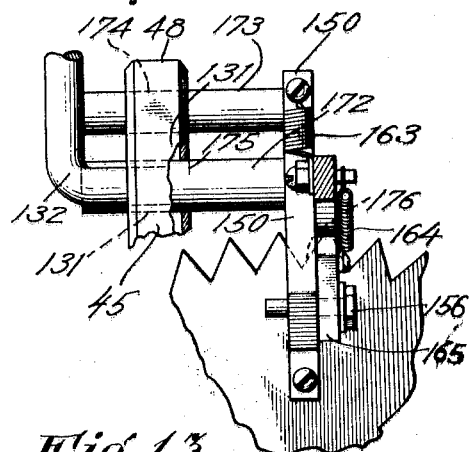
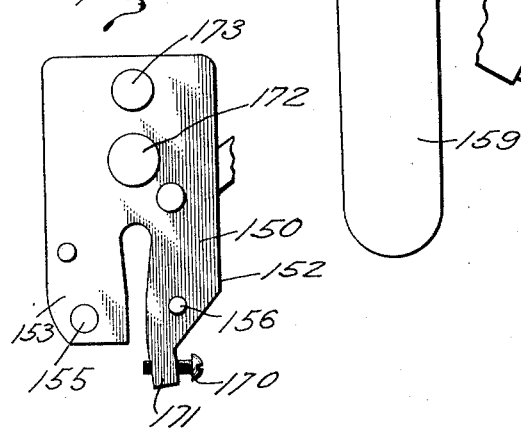
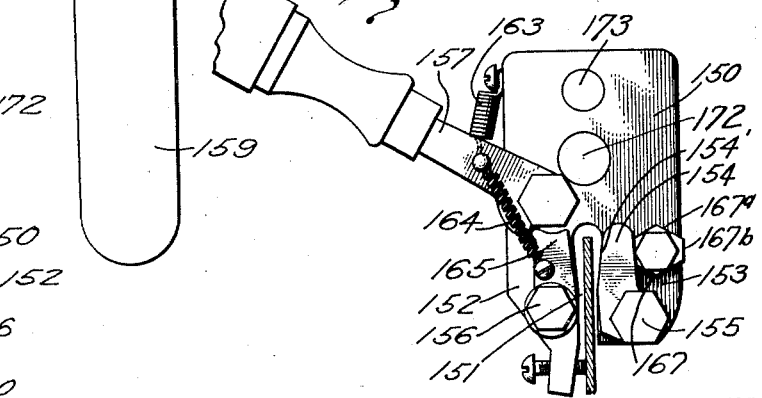
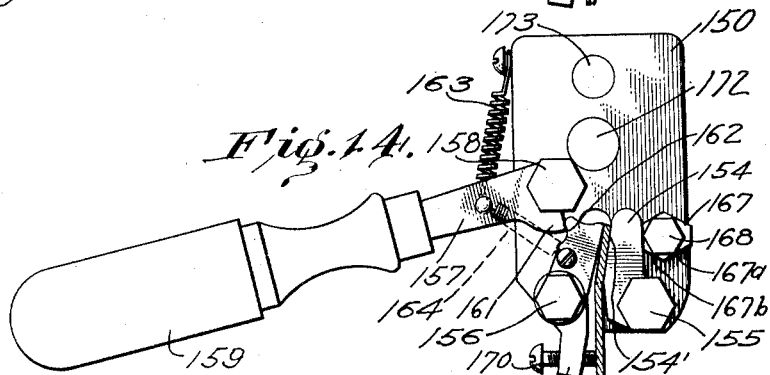
INVENTOR.
John A. Waller
BY Arthur P. Knight and
Alfred W. Knight
ATTORNEYS Patented Apr. 5, 1932

1,852,276

UNITED STATES PATENT OFFICE

JOHN A. WALLER, OF BEVERLY HILLS, CALIFORNIA, ASSIGNOR TO WALLER MANUFACTURING CORPORATION, LTD., OF LOS ANGELES, CALIFORNIA, A CORPORATION OF NEVADA

APPARATUS FOR DRESSING CIRCULAR SAWS

Application filed July 16, 1929. Serial No. 378,783.

This invention relates to apparatus for dressing circular saws, that is, for performing any desired operation on the teeth thereof, such as sharpening or setting, in order to better fit the same for use.

The principal object of the invention is to provide improved means whereby any desired dressing operation on circular saws may be expeditiously and satisfactorily carried out by hand, as distinguished from the present necessity of dressing such saws mechanically in machines which are relatively complicated and costly. Heretofore, any shop or individual using circular saws has been compelled to either install expensive machinery for sharpening, setting or otherwise dressing the same, or else have this work done at some other shop which is so equipped, and the dressing of such saws has, therefore, been a source of considerable trouble and loss of time. By the use of the apparatus of my invention, on the other hand, circular saws may be sharpened, set, or otherwise dressed, quickly and by means of relatively simple and inexpensive equipment, which may be easily installed and operated in any shop and without the necessity for any peculiar skill or experience.

A further object of the invention is to provide improved means whereby a manually operated sharpening, setting or other dressing tool may be so mounted relative to a circular saw as to permit rapid shifting thereof from one tooth of the saw to another so as to operate successively on all the teeth, and may be easily and positively brought to position of proper alignment with respect to each of said teeth.

A further object of the invention is to provide means whereby the relative position of a sharpening, setting, or other dressing tool relative to the teeth of a circular saw, may be readily adjusted to meet requirements, such adjustment being particularly in a direction extending radially of the saw.

A further object of the invention is to provide an apparatus of this type which is adaptable to saws of different sizes, both as to diameter and thickness as well as to saws having different spacings and configurations of the teeth.

A particular object of the invention is to provide an apparatus for use in filing or sharpening the teeth of a circular saw, having means for supporting a file in position of engagement with a tooth of the saw, so as to permit operation of said file on said tooth, means for permitting angular adjustment of said file according to the angle at which the teeth are to be filed, and means for insuring uniform action of the file on all similar teeth of the saw. A further object in this connection is to provide for automatically raising the file clear of the teeth when it is desired to shift the same into engagement with another tooth.

The accompanying drawings illustrate apparatus according to this invention and referring thereto:

Fig. 1 is a front view of the apparatus with a circular saw mounted therein and with a filing or sharpening device in operative engagement between two of the teeth of said saw.

Fig. 1a is a section on line a—a in Fig. 1.

Fig. 2 is a similar view with the filing device raised clear of the teeth, so as to permit shifting thereof into position of engagement with the next adjacent similarly disposed teeth.

Fig. 3 is a plan view of the apparatus shown in Fig. 1.

Fig. 3a is a section on line a—a in Fig. 3.

Fig. 4 is a longitudinal section of the filing device on line 4—4 in Fig. 3.

Fig. 5 is a side elevation of the apparatus taken from the left side of Fig. 1.

Fig. 6 is a horizontal section on line 6—6 in Fig. 1.

Fig. 7 is a transverse section through the forward portion of the filing device, taken on line 7—7 in Fig. 3, with certain parts broken away.

Fig. 8 is a horizontal section on line 8—8 in Fig. 1.

Fig. 9 is a section on line 9—9 in Fig. 6, showing the supporting bracket by means of which the apparatus is adapted to be mounted upon a bench or table.

Fig. 10 is a section on line 10—10 in Fig. 3.

Fig. 11 is a plan view of a setting device mounted on the tool receiving head of the apparatus in place of the filing device.

Fig. 12 is a vertical section on line 12—12 in Fig. 11.

Fig. 13 is a side elevation of the setting device taken from the right in Fig. 12.

Fig. 14 is a similar view showing the setting device in operated position.

Fig. 15 is a side elevation of the setting device taken from the left side in Fig. 12.

The apparatus shown in the drawings comprises a supporting bracket 1 including a vertical plate 2 and a horizontal plate 3 secured together in any suitable manner. Said supporting bracket is provided with means for securing the same to a work bench or table. For this purpose, as shown particularly in Figs. 3, 6 and 10, the vertical plate 2 is provided at its ends with inwardly turned flanges 4 having pointed projections or teeth 5 adapted to enter the front edge or face of said table or bench, while the horizontal plate 3 is provided at its ends with upwardly turned flanges 6 having arms 7 pivotally mounted at the forward ends thereof as on pivot pins 8. Said arms have downwardly projecting prongs or points 9 at their inner ends adapted to enter the top of said table or bench. The prongs 9 extend through slots 10 in the horizontal plate 3, and the outer faces of said prongs are preferably inclined rearwardly and upwardly from the point of the prong as shown at 11. The arms 7 are provided with horizontally elongated slots 12 fitting over the pivot pins 8, so as to permit relative horizontal movement of the parts. The construction is, therefore, such that if the supporting bracket is placed with the teeth 5 engaging the front face of the table or bench shown at 15 and the prongs 9 engaging the top face thereof, one or more downward blows of a hammer on each of the arms 7 will not only drive the prongs 9 into the top of the bench, but will also cause the inclined faces 11, by engagement with the outer ends of slots 10, to force the supporting bracket rearwardly relative to said arms and to the bench and draw the teeth 5 inwardly into engagement with the front of the bench. The engagement of prongs 9 in the top of the bench prevents forward displacement of arms 7, so that the relative motion caused by inclined faces 11 must result in rearward or inward motion of the bracket.

The flanges 4 hold the vertical plate 2 out away from the front face of the bench, as shown, for example, in Fig. 6, and the central portion 2' of said plate is offset inwardly from the rest of the plate, so as to provide a vertically elongated central recess 16. Spaced along the vertical medium line of said recess are provided a plurality of threaded openings 17 in plate portion 2', while a pin or bolt 18 provided with a reduced and threaded inner end portion 19 is adapted to be screwed into any one of said openings 17, according to the size of circular saw to be mounted on the apparatus. A clamping sleeve 21 is slidably mounted on pin 18 and is provided with a bevelled or frusto-conical face 22 at its inner end adapted to enter into and wedge against the edges of the central opening 23 of a circular saw 24, and at the same time center said saw with respect to pin 18. Recess 16 permits the inner end of pin 18 to project through said opening to effect this clamping action. Sleeve 21 may be forced inwardly to accomplish the above described clamping action by means of wing nut 26 screwing on the outer end of pin 18. The apparatus above described constitutes a means for clamping a circular saw and supporting the same in position on or in front of a bench or the like, and may be used for this purpose independently of the remainder of the apparatus if desired.

The means for supporting a dressing tool in position of engagement with a circular saw, thus clamped to the supporting bracket, is shown in Figs. 1, 3, 5 and 6 as comprising rotatable supporting means comprising a hub member 28 fitting loosely and rotatably over the sleeve 21 and having a flange 29 at its inner end. The inner face of said flange adjacent the outer edge thereof constitutes a bearing surface indicated at 31 adapted to frictionally bear against the outer face of the circular saw, so as to tend to hold hub member 28 in any position to which it is moved while permitting movement thereof upon application of a certain force. The remaining portion 31' of said inner face, inside the bearing portion 31, is preferably recessed as shown, so as to limit the frictional bearing surface between the saw and flange 29. The friction between bearing surface 31 and the circular saw may be adjusted by means of an L-shaped member 32 having an arm 33 engaging in an annular groove 34 adjacent the forward end of sleeve 21 and an arm 36 extending alongside a flat faced projection 37 on hub member 28. A threaded pin 38 projects from the portion 37 through a horizontal slot 39 in arm 36, so that said arm may be clamped by means of wing nut 41 in any desired relative position with respect to sleeve 21. By means of this construction, tightening of wing nut 26 on pin 18 will not only clamp the saw as above described but will also exert an inward pressure through the L-shaped member 32 upon hub member 28 and cause bearing surface 31 to be held against the outer face of the saw with a force dependent upon the relative position in which arm 36 has previously been clamped by wing nut 41. This adjustment should in most cases be such that the friction between the saw and flange 29 is less than that between the saw and the outer face of plate 2 of the supporting bracket.

The hub member 28, comprising the rotatable supporting means is also provided at one side with an enlarged portion 43 provided with a guide channel 44 in which is slidably mounted a supporting bar 45. Said supporting bar preferably extends parallel to the plane of the saw and is normally substantially vertical when the dressing tool is in operative position with respect to the saw. Bar 45 may be retained in channel 44 by means of plates 46 and 47 secured in front of the portion 43 and extending across in front of said bar. Bar 45 is provided at its upper end with a tool receiving and supporting head 48 which may be either formed integrally with said bar or secured thereto in any suitable manner. Said head extends inwardly over the periphery of the saw blade and is provided with a portion 49 extending downwardly behind the saw. The head 48 is also provided with suitable means such as hereinafter described for securing any desired tools or devices thereto for dressing the saw.

The bar 45 is provided at its lower end with means adapted to engage between the teeth at the lower part of the saw, so as to determine the position of bar 45 and hence of the dressing tool or device mounted at the upper end of said supporting bar, with respect to the teeth at the upper part of the saw. The means for this purpose, as illustrated particularly in Figs. 1, 2, 5, and 8, may comprise a horizontal arm 51 adapted to be adjustably secured to said bar and a positioning lever 52 pivotally mounted at 53 on said arm. The arm 51 is shown as bent in U-shape, so as to extend around three sides of bar 45. The main arm 51 lies behind said bar, while the portion 55 lies in front of said bar, and a wing bolt 54 is provided whereby the portions 55 and 51 may be clamped together about the bar 45, so as to hold said arm in any relative position to which it may be adjusted. The main portion of arm 52 lies behind the arm 51, but said arm 52 is bent in S-shape, having a portion 56 disposed in front of arm 51 and a portion 57 disposed in front of and spaced from the portion 56. The pivot pin 53 extends through the portions 56, 51 and 52 of the arms above mentioned. At the free end of arm 52 is provided a pivotally mounted positioning member 58 consisting, for example, of a short threaded pin engaging in a threaded opening 59 in said arm and having its inner end 60 formed as a three sided prism whose upper edge 61 is located at the axis of said pin, so that the position of said upper edge remains fixed regardless of the angular position of said positioning member.

Arm 52 is provided with adjustable fulcrum means for controlling the movement of said arm to bring the positioning member 58 into and out of engagement between the teeth as hereinafter described. Such fulcrum means may comprise a nut 62 bearing against the lower faces of portions 56 and 57 of arm 51 and threadedly mounted for vertical adjustment on a rod 63 extending through the space between said portions. The upper portion of rod 63 extends through a split clamping member 64 provided with a clamping screw 65 whereby said rod may be secured in any position of vertical adjustment relative to said clamping member. Clamping member 64 is secured to the above mentioned portion 43 which forms a guide for bar 45, or may be otherwise secured in any suitable manner to the rotatable supporting hub 28.

Means are also preferably provided exerting a resilient upward force on bar 45, so as to tend to raise said bar and to raise the tool or device mounted at the upper end thereof out of engagement with the teeth of the saw, so that it is necessary to exert a slight downward pressure of the hand in said tool or device when it is desired to bring the same into operative position. The means for thus biasing the supporting bar 45 toward raised position may comprise a tension spring 67 connected at its upper end to a flange 68 on plate 47 and at its lower end to a split collar 69 which may be clamped in any desired relative position on bar 45 by means of wing bolt 70. Means may also be provided for limiting the downward movement of bar 45 and of the tool or device carried thereby, such means comprising, for example, a split collar or member 72 slidably embracing bar 45 above the guide means 43, and provided with a wing bolt 73 for clamping the same in any desired relative position to which it may be adjusted, and a threaded pin or screw 74 mounted for vertical adjustment in member 72, the lower end 75 of said pin being adapted to engage flange 68 aforesaid to limit such downward movement.

In Figs. 1, 2, 3, and 5 a saw filing or sharpening device is shown as mounted on the tool receiving head 48 of supporting bar 45, and the construction of said filing or sharpening device is further illustrated in Figs. 3a, 4 and 7. Said device comprises a file carrying frame including two parallel rods 76 and file supporting means 77 and 78 at the front and rear ends respectively of said rods. The rods 76 are slidably mounted in a guide member 79 comprising a horizontal plate 81 and two depending flanges 82 having openings 83 for slidably receiving said rods. The guide member 79 is mounted upon the tool receiving head by means of an arm 84, and means are provided permitting angular adjustment of said guide member with respect to said arm, about an axis extending through the lower edge of the file and perpendicular thereto, said axis being normally vertical when the file is horizontal. For this purpose said arm is shown as provided with an enlarged head 85 engaging beneath the horizontal plate portion 81 of said guide member and having a threaded pin 86 projecting upwardly through said plate portion. The guide member 79 and hence the entire file carrying device may thus be swung about pin 86 as a pivot. For rapidly adjusting the file carrying device to any desired position of angular adjustment and holding the same in such position, I provide a holding member 87 engaging over pin 86 and beneath a wing nut 88 screwing on the upper end of said pin, said holding member having a downwardly projecting lug 89 at its outer end (shown in Fig. 3a) engaging in a groove 90 in the upper side of arm 84 and adapted to engage in any one of a plurality of notches 91 formed at the arc-shaped edge 93 of plate 81. Said notches may correspond to different angular positions of the file about the above mentioned axis, for filing different circular saws. The member 87 may be provided with an elongated slot 92 fitting over the pin 86, so as to permit said member to slide, to move the lug 89 thereon into or out of engagement with the notches 91.

The forward file supporting means 77 may comprise a plate 95 rigidly secured to the forward ends of rods 76 by means of nuts 96, and a shank or stem 97 pivotally journaled in an opening 98 in said plate, said shank having an enlarged portion 99 lying rearwardly of, and abutting against the rear face of, plate 95 and provided with a V-shaped notch 101 adapted to receive one end of a three cornered file indicated at 102. Suitable handle means 103 are secured to the forward portion of shank 97, as by means of pin 113, said handle means being used for moving the file back and forth over the teeth of the saw and also for turning said shank in the bearing opening 98, so as to adjust the angular position of said file about a longitudinal axis. Suitable means are also provided for limiting the angular position to which the file may be adjusted from its middle position and for holding the same in any position to which it may be so adjusted. Such means may comprise a segment 104 secured to shank 97 as by means of lugs 105 on said segment engaging in notches 106 in handle means 103, and slidably engaging the front face of a recessed portion 95' of plate 95, and a threaded pin 107 pivotally connected to said segment by pin 108 and extending loosely through a member 109 which is in turn provided with a pin portion 110 pivotally mounted in the upper portion of plate 95. A nut 111 on the upper end of pin 107 serves to limit angular movement of the file to one side or the other by engagement with the upper face of member 109 as shown in Fig. 7, it being evident that by screwing said nut up or down on said pin the amount of such angular adjustment permitted thereby may be varied as desired. A set screw 112 screws into the front end of member 109 and is adapted to engage pin 107, so as to prevent subsequent relative movement of said pin in member 109 and thus hold the file in any position to which it may be adjusted. For clamping the forward end of the file in the notch 101, I have provided a U-shaped strap 114 whose lower portion extends in a groove 115 in the enlarged portion 99 of the shank and whose side portions extend upwardly at the sides of said enlarged portion and are connected at their upper ends by a pin or bar 116. A screw 117 is threaded into the lower portion of strap 114 and bears against the inner face of groove 115 so that tightening said screw draws the member 116 downwardly to clamp this end of the file. I have shown the file in this case as provided with only a short stub 118 adapted to engage beneath member 116, but a file having the usual elongated shank may also be used if desired, the handle 103 and shank 97 being recessed or cut away as shown at 103' and 97' respectively, and the segment 104 being provided with an opening 104', so as to accommodate the shank of the file as shown, for example, in dotted lines at 118' in Fig. 4.

The supporting means 78 for the rear end of the file may comprise a member 121 of inverted U-shape, having openings 122 slidably engaging rods 76, and a file receiving element 123 having a pin 124 pivotally mounted at the lower portion of member 121 and a V-shaped notch 125 adapted to receive the rear end of the file. The file may be clamped in position in said notch by means of a clamping screw 126 whose head 127 bears down upon the upper face of the file. The member 121 may be adjusted longitudinally on rods 76, according to the length of file to be used and may be clamped in proper position by means of screw 126' passing through the upper portion of member 121 and threaded into a clamping member 128 adapted to engage against the lower sides of rods 76 on tightening of said screw.

The supporting arm 84 of the saw filing device may be removably mounted upon the tool receiving head 48 in any suitable manner, but I prefer to support said rod thereon in such position that the axis of pivot pin 86 about which the file is adapted to be swung in a substantially horizontal plane, lies substantially in the plane of the saw. I also prefer to mount said arm on said receiving head, so that the lower edge of the file is diametrically opposite the position of the upper edge 61 of the positioning member 58. For this purpose the receiving head 48 is shown as provided with a round opening 131 extending transversely therethrough with its center substantially in the plane of the saw and adapted to receive arm 84. Said arm is adapted to slide in and out of said opening, so as to permit mounting and dismounting of the file or other tool, and also to rotate therein so as to permit vertical angular adjustment of such file or other tool to the desired angular position relative to the plane of the saw. Said arm may be clamped in any desired position by means of a clamping lever 132 having an eccentric portion 133 extending in an opening 134 which lies alongside the opening 131 and opens into the same at one side, and a handle portion 136 whereby the eccentric portion 133 may be rotated to bring the same into or out of clamping engagement with arm 84. In order to designate the proper lateral position of the saw filing device, arm 84 may be provided with a mark 140 (see Fig. 3), so located that when this mark is brought to the nearer face of head 48 the lower edge of the file is in position to engage the saw diametrically opposite the point of engagement of the upper edge of positioning member 58 therewith. This relation is preferably provided by having the lower edge of the file and the upper edge of said positioning member spaced from bar 45 by a distance equal to the spacing of said bar from the center of the saw, so that a diametrical line may be drawn, as at X in Fig. 1, passing through these three points and parallel to said bar.

The manner of operation of the above described apparatus including the saw filing device is as follows: The supporting bracket 1 is first mounted as above described on a suitable bench or table and the circular saw to be dressed is clamped thereto by means of sleeve 21 and wing nut 26 as above described. For saws of different sizes it may be necessary to change the vertical position of the saw clamping means with respect to bracket 1 by inserting the threaded inner end of bolt 18 in a particular one of the openings 17, such that the upper edge of the saw projects somewhat above the upper edge of the vertical plate 2, of said bracket, and preferably so that said upper edge of the vertical plate is fairly close to the bottoms of the notches between the teeth, so as to support this portion of the saw and prevent deflection thereof due to the inward thrust exerted thereon during operation of the filing device.

The saw filing device is then mounted on the tool-receiving head 48 in the position above described, and is angularly adjusted to conform to the shape of the teeth which are to be filed first. Such adjustment includes adjustment of the direction of the file by rotation about a substantially vertical axis, that is, about pivot pin 92, so as to conform to the horizontal angle of the faces of said teeth, and also about an axis extending longitudinally of the file, this latter adjustment being obtained by loosening set screw 112 and turning the file to the desired inclination at one side or the other about the pivotal means 97 and 124 and then tightening said set screw with the file in this position.

Before clamping arm 84 to the tool-receiving head 48, said arm is brought to the above mentioned position with the mark 140 thereon in line with the face of said head, and said arm may also be rotated in the opening 131, so as to bring the file either in a horizontal plane or in a plane inclined either upwardly or downwardly toward the rear of the file, according to the vertical inclination at which the teeth are to be filed. Said arm is then clamped in the desired position by means of the clamping lever 132 as above described.

The file is then brought into engagement in the notch between a pair of teeth whose opposing faces are to be filed as shown in Fig. 1, and with the file held in this position, the wing bolt 54 may be loosened and arm 51 moved up or down on bar 45 to such position that, when the positioning arm 52 is held in substantially horizontal position about its pivot 53, the upper edge 61 of position member 58 is in tight engagement between the teeth diametrically opposed to the teeth engaged by the file. Said wing bolt is then tightened so as to hold arm 51 in this relative position with respect to bar 45. Clamping screw 65 is then loosened and rod 63 is so adjusted as to bring the fulcrum member, consisting of nut 62, into tight engagement beneath the portions 56 and 57 of arm 52, while the positioning member 58 is still in tight engagement with the teeth of the saw. Clamping screw 65 is then tightened and, if necessary, the nut 62 may be screwed up on rod 63, so as to insure perfectly tight engagement of the positioning member with the teeth of the saw when the parts are in the position above described, this position being shown in Fig. 1.

Wing bolt 70 is then loosened and collar 69 moved downwardly on bar 45, so as to place spring 67 under sufficient tension, and said collar is then clamped in this position by means of said bolt. The tension thus given to said spring should be sufficient so that when the downward pressure of the hand on the filing device is removed said spring will raise bar 45 and the filing device to the position shown in Fig. 2, that is, to a position in which the file is clear of the tips of the saw teeth. This upward movement is limited by engagement of collar 69 with the bottom face of portion 43. It will be noted that the upward movement of bar 45 also raises arm 51 and pivot pin 53, and since the fulcrum member 62 remains fixed, the free end of positioning arm 52 is permitted to fall by its own weight sufficiently to also remove positioning member 58 from engagement between the teeth of the saw. It is evident, therefore, that the raising of bar 45 by spring 67 serves not only to lift the file clear of the teeth but also to remove the positioning member from engagement with the teeth, thus permitting rotation of hub member 28 and all parts of the apparatus carried thereby to such position as to bring the file in alignment with the next adjacent similarly disposed teeth, for example with the second notch removed from the notch in which it was previously engaged. If the saw filing device is then forced downwardly by the hand, arm 51 will also be lowered, thus bringing arm 52 again into engagement with fulcrum member 62 and causing positioning member 58 to enter the second notch removed from its former position, and the engagement of said positioning member in this notch will insure proper alignment of the file in the notch diametrically opposed thereto.

With the file in engagement with any one of the notches of the saw, said file may be manually drawn back and forth in said notch to sharpen the faces of the teeth. The filing action is usually performed during the inward stroke of the file, and during such inward stroke a downward pressure is exerted on the file, so as to hold the same against the work. This downward pressure may be released on the outward stroke, whereupon spring 67 will lift the file slightly off of the faces of the teeth. The file may be operated in any one position as long as required to sharpen the teeth to the desired extent, when it may be raised and shifted to the next similar tooth as above described. However, it is preferable to give the saw a partial rotation each time the file is shifted so that the teeth being filed are always substantially at the top of the saw. For this purpose, just before the file is to be shifted to another tooth, and while said file is still in engagement between the teeth which have just been sharpened, the operator may conveniently move the filing device a short distance to right or left, so as to rotate the saw therewith in a clockwise or counter-clockwise direction, the amount of such partial rotation being sufficient to bring the next similarly disposed teeth in position substantially at the top of the saw. When the file is then raised out of engagement with the saw and moved back to position with the bar 45 substantially vertical, the saw will remain in its new position due to the greater friction between the saw and the supporting bracket 1 than between the saw and the bearing surface 31 on flange 29.

When all of the similarly disposed teeth have been filed, the file may be adjusted to the proper angular position for the alternate teeth, and such alternate teeth may then be filed in the same manner.

Other dressing tools may also be mounted on the receiving head 48 in position to engage the teeth of the saw. For example, in Figs. 11 to 15 inclusive I have illustrated a setting device and the manner in which the same may be mounted. Such setting device comprises a plate 150 having a notch 151 extending upwardly from the lower edge thereof, so that the two side portions 152 and 153 at the opposite sides of said notch are adapted to extend down over the sides of the saw and embrace the teeth therebetween. For setting the teeth of the saw said plate is provided with a relatively fixed dog 154 mounted thereon by means of screw 155, and a relatively movable dog 165 pivotally mounted on screw 156 at the forward side of notch 151. For operating said movable dog I provide a lever 157 pivotally mounted at 158 and having handle means 159, said lever being provided with a shoulder 161 engaging a suitably shaped surface 162 on said movable dog, so that depression of said lever forces said dog to move in a clockwise direction about its pivot (Figs. 13 and 14) and towards the relatively fixed dog 154. Lever 157 is normally held in raised position and returned to such position upon release thereof, by means of spring 163, while a second spring 164 connected at one end to said lever and at the other end to dog 165 tends to hold said dog forward and away from the dog 154, in the position shown in Fig. 13. In order to adjust the amount of set to be given to the teeth, the relatively fixed dog 154 may be adjusted about screw 155 as a pivot, so as to vary the relative position of the forward face 154' thereof. The position to which said dog is adjusted may be regulated by a stop member 167 having a plurality of faces 167a, 167b, etc., and pivotally mounted about a screw 168, said faces lying at different distances from the center of said screw, so that if said stop member is turned to position with a certain one of said faces disposed to engage dog 154, and is then clamped in this position by screw 168, the position of said dog is determined thereby. The device may also be provided with a screw 170 mounted in an arm 171 projecting downwardly from the side portion 152, the inner end of said screw being adapted to engage the front face of the saw somewhat below the teeth thereof, so as to prevent bending of the main portion of the saw blade during the setting operation and confine the bending action substantially to the teeth themselves.

The setting device above described may be mounted on the tool-receiving head 48 by means of an arm 172 adapted to engage in the opening 131 above mentioned, and a second arm 173 is also preferably provided, adapted to engage in a second opening 174 directly above the opening 131, said second arm serving to more positively hold the settting device against rotative movement on said receiving head. Arm 172 may advantageously be provided with a mark 175 so positioned thereon that when said mark is brought in line with the nearer face of head 48 the dogs 154 and 165 will be aligned substantially centrally of one of the teeth of the saw as indicated in dotted lines at 176 in Fig. 12, whenever the positioning member 58 at the lower end of bar 45 is in engagement in a notch between two teeth of the saw at the lower portion thereof. The setting device may be clamped in position by means of the clamping lever 132 in the same manner as above described, or may be clamped thereto in any other suitable manner.

In using the apparatus for setting the teeth of a circular saw, the saw is mounted therein in the same manner as above described and the supporting means and positioning means are so adjusted as to bring the dogs 154 and 165 of the setting device in position of proper engagement with one of the teeth which is to be given a set backwardly from the plane of the saw. Lever 157 is then depressed forcing dog 165 inwardly, so as to bend this tooth over and set the same as shown in Fig. 14. It will be understood that as with the saw filing device, the setting device is also normally held by means of spring 67 up out of operative position and must be forcibly depressed to operative position by downward pressure of the hand on said device or on the head 48. When this first tooth has been sufficiently set, the downward pressure of the hand is released, which raises the setting device and simultaneously releases positioning member 58 from engagement between the teeth at the bottom of the saw in the same manner as above described, so that the setting device may then be moved in one direction or the other into alignment with the next tooth to be set in the same direction which will ordinarily be the second tooth removed. The setting device is then again lowered to operative position, which brings the positioning member 58 again into engagement with the teeth at the bottom of the saw, so as to exactly position the dogs of the setting device in alignment with this tooth. The device is then operated as before, and this procedure is continued until all of the similarly disposed teeth have been properly set. The saw may then be removed and reversed, and the operation repeated on the remaining teeth, said remaining teeth being thus set in an opposite direction from the plane of the saw than the teeth set during the first operation.

The construction of the setting device itself is not part of the invention claimed herein, but is claimed in a separate application filed by me.

I claim:

1. An apparatus for dressing circular saws comprising fixed supporting means, rotatable supporting means, means for mounting said rotatable supporting means on said fixed supporting means and for clamping a saw in position therebetween, so as to permit independent rotation of the saw and of said rotatable supporting means relative to said fixed supporting means about the center of the saw, said fixed and rotatable supporting means frictionally engaging the respective faces of the saw, means for adjusting the relative frictional resistance between the saw and the respective supporting means, and a supporting bar on said rotatable supporting means provided at its upper end with means adapted to receive and support a saw dressing tool in position of engagement with the teeth of said saw.

2. An apparatus for dressing circular saws comprising fixed supporting means, means for mounting a circular saw on said fixed supporting means, rotatable supporting means mounted on said fixed supporting means and rotatable about the center of the saw, a supporting bar on said rotatable supporting means provided at its upper end with means adapted to receive and support a saw dressing tool in position of engagement with the teeth of said saw at the upper portion of the saw, and provided at its lower end with positioning means adapted to engage the teeth of the saw at the lower portion thereof so as to bring said dressing tool in exact alignment with the teeth substantially diametrically opposite said positioning means.

3. An apparatus for dressing circular saws comprising fixed supporting means, means for mounting a circular saw on said fixed supporting means, rotatable supporting means mounted on said fixed supporting means and rotatable about the center of the saw, a supporting bar on said rotatable supporting means provided at its upper end with means adapted to receive and support a saw dressing tool in position of engagement with the teeth of the saw at the upper portion of said saw, and spring means biasing said supporting bar upwardly so as to hold said dressing tool out of operative engagement with the teeth of the saw, so that downward manual pressure is required to bring said dressing tool into position of operative engagement.

4. An apparatus for dressing circular saws comprising fixed supporting means, means for mounting a circular saw on said fixed supporting means, rotatable supporting means mounted on said fixed supporting means and rotatable about the center of the saw, a vertically extending supporting bar mounted on said rotatable supporting means and provided at its upper end with a tool receiving head projecting inwardly over the saw, said head being provided with a tool receiving opening substantially in the plane of the saw, a saw dressing tool in position to operatively engage the teeth at the upper portion of the saw and at one side of said vertically extending supporting bar, said tool being provided with an arm adjustably engaging in said tool receiving opening, said head having means for clamping said arm, said vertically extending supporting bar being vertically slidable on said rotatable supporting means so as to vary the relative position of said dressing tool with respect to the periphery of the saw, and adjustable stop means for limiting the downward movement of said vertically extending supporting bar.

5. An apparatus for dressing circular saws comprising fixed supporting means, means for mounting a circular saw on said fixed supporting means, rotatable supporting means mounted on said fixed supporting means and rotatable about the center of the saw, said rotatable supporting means being provided with a member vertically slidable thereon, means at the upper end of said vertically slidable member adapted to receive and support a saw dressing tool in position of engagement with the teeth of the saw when said vertically slidable member is moved downwardly and in position above such position of operative engagement upon upward movement of said vertically slidable member, positioning means mounted at the lower end of said vertically slidable member and adapted to engage the teeth at the lower portion of the saw so as to determine the relative position of the saw dressing tool with respect to the teeth at the upper portion of the saw, and means for moving said positioning means into position of engagement with the teeth of the saw upon downward movement of said vertically slidable member and for removing said positioning means from such position of engagement upon upward movement of said vertically slidable member.

6. An apparatus as set forth in claim 5 and comprising in addition, spring means tending to hold said vertically slidable member upwardly.

7. An apparatus as set forth in claim 5 and comprising in addition, spring means tending to hold said vertically slidable member upwardly, and means for adjusting said spring means so as to determine the length of movement of said vertically slidable member.

8. An apparatus as set forth in claim 5, said positioning means being vertically adjustable with respect to said vertically slidable member, so as to adjust the same for use with saws of different diameters.

9. An apparatus for dressing circular saws comprising fixed supporting means, means for mounting a circular saw on said fixed supporting means, rotatable supporting means mounted on said fixed supporting means and rotatable about the center of the saw, said rotatable supporting means being provided with a member vertically slidable thereon, means at the upper end of said vertically slidable member for receiving and supporting a dressing tool in such position as to operatively engage the teeth at the upper part of the saw upon lowering of said vertically slidable member and to be raised out of such operative engagement upon raising of said vertically slidable member, positioning means pivotally mounted at the lower end of said vertically slidable member and having means adapted to engage the teeth at the lower part of the saw, and fulcrum means supported on said rotatable supporting means independently of said vertically slidable member and engaging said pivotally mounted positioning means between its point of pivotal support and its point of engagement with the teeth of the saw, whereby lowering of said vertically slidable member will raise said positioning means into tooth engaging position and raising of said vertically slidable member will cause said positioning means to move downwardly out of tooth engaging position.

10. An apparatus as set forth in claim 9, and comprising means for vertical adjustment of the pivotal support of said positioning means relative to said vertically slidable member.

11. An apparatus as set forth in claim 9, and comprising means for vertical adjustment of said fulcrum means relative to said rotatable supporting means.

12. An apparatus for filing circular saws comprising fixed supporting means, rotatable supporting means, means for mounting said rotatable supporting means on said fixed supporting means and for clamping a circular saw therebetween, and file carrying means mounted on said rotatable supporting means and having means for supporting a file in position for engagement with the teeth of said saw, said file supporting means being mounted so as to permit sliding movement of said file in a direction transverse to the plane of the saw and adjustment of the direction of the file about a substantially vertical axis lying substantially in the plane of the saw and passing substantially through the lower edge of the file, and means for holding said file in any desired position of such adjustment.

13. An apparatus for filing circular saws comprising fixed supporting means, rotatable supporting means, means for mounting said rotatable supporting means on said fixed supporting means and for clamping a circular saw therebetween, and file carrying means mounted on said rotatable supporting means and having means for supporting a file in position for engagement with the teeth of said saw and for permitting sliding movement of said file in a direction transverse to the plane of the saw, said file carrying means being mounted on said rotatable supporting means in such manner as to permit vertical angular adjustment of the file about a substantially horizontal axis lying substantially in the plane of the saw and somewhat above the upper edge of the saw.

In testimony whereof I have hereunto subscribed my name this 27th day of June, 1929.

JOHN A. WALLER.